US011085559B2

(12) United States Patent
Clements

(10) Patent No.: US 11,085,559 B2
(45) Date of Patent: Aug. 10, 2021

(54) INTERLOCKED LAYER AND METHOD OF MANUFACTURE

(71) Applicant: BAKER HUGHES ENERGY TECHNOLOGY UK LIMITED, Bristol (GB)

(72) Inventor: Richard Clements, Durham (GB)

(73) Assignee: BAKER HUGHES ENERGY TECHNOLOGY UK LIMITED, Bristol (GB)

( * ) Notice: Subject to any disclaimer, the term of this patent is extended or adjusted under 35 U.S.C. 154(b) by 101 days.

(21) Appl. No.: 16/323,738

(22) PCT Filed: Aug. 22, 2017

(86) PCT No.: PCT/GB2017/052476
§ 371 (c)(1),
(2) Date: Feb. 6, 2019

(87) PCT Pub. No.: WO2018/046885
PCT Pub. Date: Mar. 15, 2018

(65) Prior Publication Data
US 2019/0211951 A1 Jul. 11, 2019

(30) Foreign Application Priority Data
Sep. 9, 2016 (GB) ..................................... 1615346

(51) Int. Cl.
*F16L 11/00* (2006.01)
*F16L 11/08* (2006.01)

(52) U.S. Cl.
CPC .................................. *F16L 11/083* (2013.01)

(58) Field of Classification Search
CPC ......... F16L 11/083; F16L 9/045; F16L 9/047; F16L 9/22; F16L 11/18; F16L 11/24; F16L 11/16
(Continued)

(56) References Cited

U.S. PATENT DOCUMENTS 1,133,070 A * 3/1915 Subers ................... F16L 11/16
138/135
3,170,720 A * 2/1965 Browning ............. F16L 27/107
285/114
(Continued)

FOREIGN PATENT DOCUMENTS

EP          1141606      10/2001
WO       WO 00/36324      6/2000
(Continued)

OTHER PUBLICATIONS

Search Report and Written Opinion in International Application No. PCT/GB2017/052476 dated Nov. 23, 2017, in 19 pages.
(Continued)

*Primary Examiner* — James F Hook
(74) *Attorney, Agent, or Firm* — Knobbe, Martens, Olson & Bear, LLP

(57) ABSTRACT

Apparatus, flexible pipe body and methods are disclosed. The apparatus comprising at least one connector body comprising a first restraining arm portion and an opposed further restraining arm portion, each extending outwardly away from a common intersecting region of the connector body and comprising a respective locking surface, and at least one support arm portion that extends from the common intersecting region substantially perpendicular to the opposed arm portions and terminates with a flared end portion providing an abutment surface, wherein a distance between the common intersecting region and an abutment surface is less than 60% of said predetermined thickness.

18 Claims, 11 Drawing Sheets

(58) Field of Classification Search
USPC .................................................. 138/120, 135
See application file for complete search history.

(56) References Cited

U.S. PATENT DOCUMENTS

| | | | |
|---|---|---|---|
| 3,173,172 A * | 3/1965 | Pasquetti ............ | B29C 66/4329 29/819 |
| 3,908,703 A * | 9/1975 | Bournazel ............... | F16L 11/16 138/120 |
| 5,254,809 A * | 10/1993 | Martin .................... | F16L 57/02 138/120 |
| 5,807,241 A * | 9/1998 | Heimberger ......... | A61B 1/0055 600/139 |
| 6,098,667 A * | 8/2000 | Odru ..................... | F16L 11/083 138/134 |
| 6,253,793 B1 | 7/2001 | Dupoiron et al. | |
| 6,354,333 B1 | 3/2002 | Dupoiron et al. | |
| 6,739,355 B2 * | 5/2004 | Glejbøl ................. | F16L 11/16 138/135 |
| 9,188,254 B2 * | 11/2015 | Gudme ................. | F16L 11/082 |
| 2004/0074553 A1 | 4/2004 | Espinasse et al. | |
| 2004/0154677 A1 | 8/2004 | Coutarel et al. | |
| 2004/0221907 A1 | 11/2004 | Glejbol et al. | |
| 2012/0266997 A1 * | 10/2012 | Thygesen ............. | F16L 11/083 138/137 |
| 2014/0014218 A1 * | 1/2014 | Gudme ................... | F16L 11/00 138/137 |

FOREIGN PATENT DOCUMENTS

| WO | WO 01/81809 | 11/2001 |
| WO | WO 2011/050810 A1 | 5/2011 |
| WO | WO 2011/073687 | 6/2011 |
| WO | WO 2012/097823 A1 | 7/2012 |
| WO | WO 2014/167346 A1 | 10/2014 |
| WO | WO 2015/049485 A1 | 4/2015 |

OTHER PUBLICATIONS

Search Report in Application No. GB 1615346.2 dated Feb. 28, 2017, in 3 pages.
International Preliminary Report on Patentability and Written Opinion for application No. PCT/GB2017/052476, dated Mar. 12, 2019, in 13 pages.

* cited by examiner

INTERLOCKED LAYER AND METHOD OF MANUFACTURE

The present invention relates to an apparatus and method for providing a pressure resistant layer of a flexible pipe using adjacent hoop-like elements. In particular, but not exclusively, the present invention relates to the interlocking of adjacent windings of a helically wound tape, or adjacent discrete hoops arranged in a side-by-side configuration, to thereby form a carcass layer and/or pressure armour layer of a flexible pipe.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). Flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or the pressure armour and tensile armour layers of the flexible pipe body is increased. It is noted for the sake of completeness that flexible pipe may also be used for shallow water applications (for example less than around 500 metres depth) or even for shore (overland) applications.

Conventional flexible pipes and certain layers within such pipes suffer from a number of different problems. For example due to internal and external pressures, at the interface between a polymer layer such as a barrier layer or liner and an opposed surface the polymer can creep into any gaps that exist between opposed windings or hoop-like elements that form the surface. For example conventionally in the case of a carcass layer of a flexible pipe, polymer from a radially innermost surface of a barrier layer, can creep into gaps between adjacent windings of a wound tape that forms the carcass layer. Alternatively, polymer from the radially outer surface of a liner or barrier can creep into gaps between adjacent windings used to form a pressure armour layer. The creep of such material can cause subsequent failure of the flexible pipe prior to its predicted end of life date.

Alternatively, the radially innermost surface of a carcass of a flexible pipe and more particularly the gaps at the radially innermost surface of the carcass layer can cause the phenomena of singing. This singing phenomena is caused by the corrugations or grooves formed by the gaps between adjacent windings creating vortex shedding sites along the length of the inner bore of the flexible pipe as fluid flows along the bore. Singing can cause catastrophic failure of certain parts of a flexible pipe and ancillary equipment connected to such a flexible pipe which can prove costly to correct. Alternatively according to a conventional solution, a fluid velocity of transported fluids must be reduced to avoid singing which can cause a degradation in permitted supply volumes.

It is an aim of the present invention to at least partly mitigate one or more of the above-mentioned problems.

It is an aim of certain embodiments of the present invention to provide a carcass layer and a method of manufacturing a carcass layer which helps cover gaps between adjacent windings or discrete hoops of a carcass layer to thus remove entirely or at least partly any vortex shedding sites.

It is an aim of certain embodiments of the present invention to provide a carcass layer and a method of manufacturing a carcass layer in which helical windings or discrete hoops that form the carcass layer include a cover covering gaps on a radially outer surface of the carcass layer to thereby help eliminate or at least significantly reduce the risk of creep of material from the barrier layer radially inwards towards the gaps of the carcass layer.

It is an aim of certain embodiments of the present invention to provide a pressure armour layer outside a barrier layer or liner of a flexible pipe in which the windings or discrete hoops which form the pressure armour layer are connected together with a connection element which helps cover the gap at the radially innermost surface of the pressure armour layer, thus eliminating or at least significantly reducing a risk of creep of the polymer from the barrier layer or liner radially outwards towards the pressure armour layer.

It is an aim of certain embodiments of the present invention to provide a mechanism for forming a flexible supportive layer in a flexible pipe and at the same time incorporating caps or covers over selected regions of the layer to help avoid creep and/or singing.

It is an aim of certain embodiments of the present invention to provide a connector that includes restraining arm portions to help restrain relative motion of adjacent hoop-like elements thereby locking them to some extent in a desired position and at least one support arm portion to help reduce a risk of creep and/or singing.

According to a first aspect of the present invention there is provided apparatus for interposing between adjacent hoop-like elements, forming a pressure resistant layer, having a predetermined thickness, of a flexible pipe, comprising:
 at least one connector body comprising a first restraining arm portion and an opposed further restraining arm portion, each extending outwardly away from a common intersecting region of the connector body and comprising a respective locking surface, and at least one support arm portion that extends from the common intersecting region substantially perpendicular to the opposed arm portions and terminates with a flared end portion providing an abutment surface, wherein a distance between the common intersecting region and an abutment surface is less than 60% of said predetermined thickness.

Aptly each restraining arm portion is a connecting arm portion of the connector body and each arm portion terminates in a respective locking member that comprises the respective locking surface wherein the connector body is for interlocking adjacent hoop-like elements.

Aptly each locking member comprises at least one turned out abutment surface at an end region of a respective arm portion that extends away from an axis of the arm portion for preventing an element riding on an outer surface of the arm portion extending beyond an end of the arm portion.

Aptly the at least one turned out abutment surface comprises a region of an outer surface of a respective arm that widens out at an end of the arm.

Aptly each locking member comprises a bead-like element at the end region of the arm.

Aptly each locking member comprises an L-shaped or T-shaped tip portion of an arm.

Aptly each restraining arm comprises a protuberance extending from the common intersecting region and each respective locking surface comprises an outer surface region of a respective protuberance.

Aptly each flared end portion abutment surface is substantially flat.

Aptly each flared end portion abutment surface is arcuate.

Aptly each flared end portion abutment surface comprises at least one projecting member or at least one recessed member.

Aptly each flared end portion abutment surface comprises at least one groove or blind hole or dimple or slit or slot or boss or post.

Aptly the connector body has a generally T-shape or cross-shaped cross section.

Aptly the connector body has a generally cross-shaped cross section and the at least one support arm portion comprises a first support arm portion and an opposed further support arm portion each extending away from the common intersecting region of the connector body in opposed directions and each comprising a respective flared end portion.

Aptly the flared end portions of the first and further support arm portions have a common shape.

Aptly the flared end portions of the first and further support arm portions have dissimilar shapes.

Aptly the connector body has a generally T-shaped cross section and the at least one support arm portion comprises only one support arm portion.

Aptly the adjacent hoop-like elements comprise adjacent windings of at least one helically wound elongate tape element and the connector body comprises an elongate helically windable tape body.

Aptly the adjacent hoop-like elements comprise a plurality of discrete non-self-interlocking hoop members arranged concentrically in a side-by-side relationship and the said at least one connector body comprises a plurality of discrete hoop members each formed as an endless ring.

According to a second aspect of the present invention there is provided flexible pipe body for transporting production fluids, comprising:
 a pressure resistant layer, having a predetermined thickness, comprising a plurality of adjacent hoop-like elements and at least one connector body comprising a first restraining arm portion and an opposed further restraining arm portion, each extending outwardly away from a common intersecting region of the connector body and comprising a respective locking surface, and at least one support arm portion that extends from the common intersecting region substantially perpendicular to the opposed arm portions and terminates with a flared end portion providing an abutment surface wherein a distance between the common intersecting region and an abutment surface is less than 60% of said predetermined thickness; wherein
 said connector body is interposed between the hoop-like elements and the restraining arm portions and respective locking surfaces at least partly restraining relative movement of adjacent hoop-like elements and said support arm portion is arranged to provide said at least one flared end portion at a radially inner and/or radially outer interface region between adjacent hoop-like elements.

Aptly each restraining arm portion is a connecting arm portion of the connector body and each arm portion terminates in a respective locking member comprising the respective locking surface wherein the connector body is for interlocking adjacent hoop-like elements.

Aptly each locking member comprises at least one turned out abutment surface at an end region of a respective arm portion that extends away from an axis of the arm portion for preventing an element riding on an outer surface of the arm portion extending beyond an end of the arm portion.

Aptly the at least one turned out abutment surface comprises a region of an outer surface of a respective arm that widens out at an end of the arm.

Aptly each locking member comprises a bead-like element at the end region of the arm.

Aptly each locking member comprises an L-shaped or T-shaped tip portion of an arm.

Aptly each restraining arm comprises a protuberance extending from the common intersecting region and each respective locking surface comprises an outer surface region of a respective protuberance.

Aptly each flared end portion abutment surface is substantially flat.

Aptly each flared end portion abutment surface is arcuate.

Aptly each flared end portion abutment surface comprises at least one projecting member or at least one recessed member.

Aptly each flared end portion abutment surface comprises at least one groove or blind hole or dimple or slit or slot or boss or post.

Aptly the connector body has a generally T-shape or cross-shaped cross section.

Aptly the connector body has a generally cross-shaped cross section and the at least one support arm portion comprises a first support arm portion and an opposed further support arm portion each extending away from the common intersecting region of the connector body in opposed directions and each comprising a respective flared end portion.

Aptly the flared end portions of the first and further support arm portions have a common shape.

Aptly the flared end portions of the first and further support arm portions have dissimilar shapes.

Aptly the connector body has a generally T-shaped cross section and the at least one support arm portion comprises only one support arm portion.

Aptly the adjacent hoop-like elements comprise adjacent windings of a helically wound elongate tape element and the connector body comprises an elongate helically windable tape body.

Aptly the adjacent hoop-like elements comprise a plurality of discrete non-self-interlocking hoop members arranged concentrically in a side-by-side relationship and said at least one connector body comprises a plurality of discrete hoop members.

Aptly the pressure resistant layer comprises a carcass layer.

Aptly the carcass layer is the radially innermost layer of the flexible pipe body and comprises a radially outer surface that supports a radially inner surface of a barrier layer of the flexible pipe body.

Aptly the flared end portion of the support arm portion is disposed in a gap on a radially inner surface of the carcass layer and provides a flared end portion abutment surface facing a bore region of the flexible pipe body.

Aptly the flared end portion of the support arm portion is disposed in a gap on a radially outer surface of the carcass layer and provides an abutment surface facing an opposed inner surface of a barrier layer of the flexible pipe body.

Aptly the pressure resistant layer is a pressure armour layer.

Aptly the pressure armour layer comprises a radially inner surface that supports a radially outer surface of a barrier layer or liner of the flexible pipe body.

Aptly the flared end portion of the support arm is disposed in a gap on a radially inner surface of the pressure armour layer and provides an abutment surface facing an opposed outer surface of a barrier layer or liner of the flexible pipe body.

According to a third aspect of the present invention there is provided a method for providing resistance to creep of polymer of a polymer layer in a flexible pipe, comprising the steps of:
providing a pressure resistant layer for a flexible pipe by interlocking adjacent hoop-like elements via at least one connector body comprising opposed connecting arm portions; and
simultaneously providing a flared out portion of a support arm portion of the connector body between adjacent interlocked hoop-like elements thereby providing an abutment surface of the flared out portion at a location to face a polymer layer of the flexible pipe juxtaposed with the pressure resistant layer for preventing creep of the polymer material of the polymer layer between the adjacent interlocked hoop-like elements.

According to a fourth aspect of the present invention there is provided a method for smoothing an inner surface provided by a carcass layer of a flexible pipe, comprising the steps of:
providing a pressure resistant layer as a carcass layer for a flexible pipe by interlocking adjacent hoop-like elements via at least one connector body comprising opposed connecting arm portions; and simultaneously providing a flared out portion of a support arm of the connector body between the adjacent interlocked hoop-like elements thereby providing an abutment surface of the flared out portion at a location to at least partially cover a gap between the hoop-like elements at a radially inner side of the carcass layer.

Aptly the method further comprises providing the pressure resistant layer by helically winding an elongate tape element; and
providing the connector body by helically winding an elongate helically windable body between adjacent windings of the elongate tape element.

Aptly the method further comprises providing the pressure resistant layer by providing a plurality of non-self interlocking hoop members concentrically in a side-by-side relationship; and
providing a connector body interlocking hoop members between each pair of adjacent hoop members in a concentric side-by-side relationship with the hoop members.

According to a fifth aspect of the present invention there is provided apparatus constructed and arranged substantially as hereinbefore as described with reference to the accompanying drawings.

According to a sixth aspect of the present invention there is provided a method substantially as hereinbefore as described with reference to the accompanying drawings.

Certain embodiments of the present invention provide a carcass layer and a method of manufacturing a carcass layer which helps eliminate or reduces a risk of singing.

Certain embodiments of the present invention provide a carcass layer and a method of manufacturing a carcass layer which helps eliminate or reduces a risk of creep of a barrier layer between adjacent windings or discrete hoops which form the carcass layer.

Certain embodiments of the present invention provide a pressure armour layer and a method of manufacturing a pressure armour layer in which a risk of creep of a barrier layer or liner outwards into the gaps between windings of the pressure armour layer or gaps between spaced apart discrete hoops that form the pressure armour layer, are eliminated or significantly reduced.

Certain embodiments of the present invention provide a connector that restrains relative motion of adjacent hoop-like elements of a layer of flexible pipe body. The connector can help restrain relative radially inward and/or outward motion and/or lateral motion caused by the moving together or apart of adjacent elements. This helps lock the adjacent elements in a desired relative position to the extent that some relative motion is permitted but is limited to some extent. The connector can be used with hoop-like elements formed as multiple discrete hoops or as consecutive windings of a long tape.

Certain embodiments of the present invention provide a flexible pipe and a method of manufacturing a flexible pipe which includes flexible pipe body having a reduced risk of singing and/or a reduced risk of creep relative to conventional flexible pipes and methods of manufacturing.

Certain embodiments of the present invention will now be described hereinafter, by way of example only, with reference to the accompanying drawings in which.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe and associated end fittings of the type which is manufactured according to API 17J. Such flexible pipe is often referred to as unbonded flexible pipe. Likewise, certain other embodiments of the present invention are usable with flexible pipe and associated end fittings for flexible pipe of a composite type structure. Such composite type flexible pipe and its manufacture is currently being standardised by the API. Such flexible pipe can include adjacent tubular layers that are bonded together.

Figure 1:
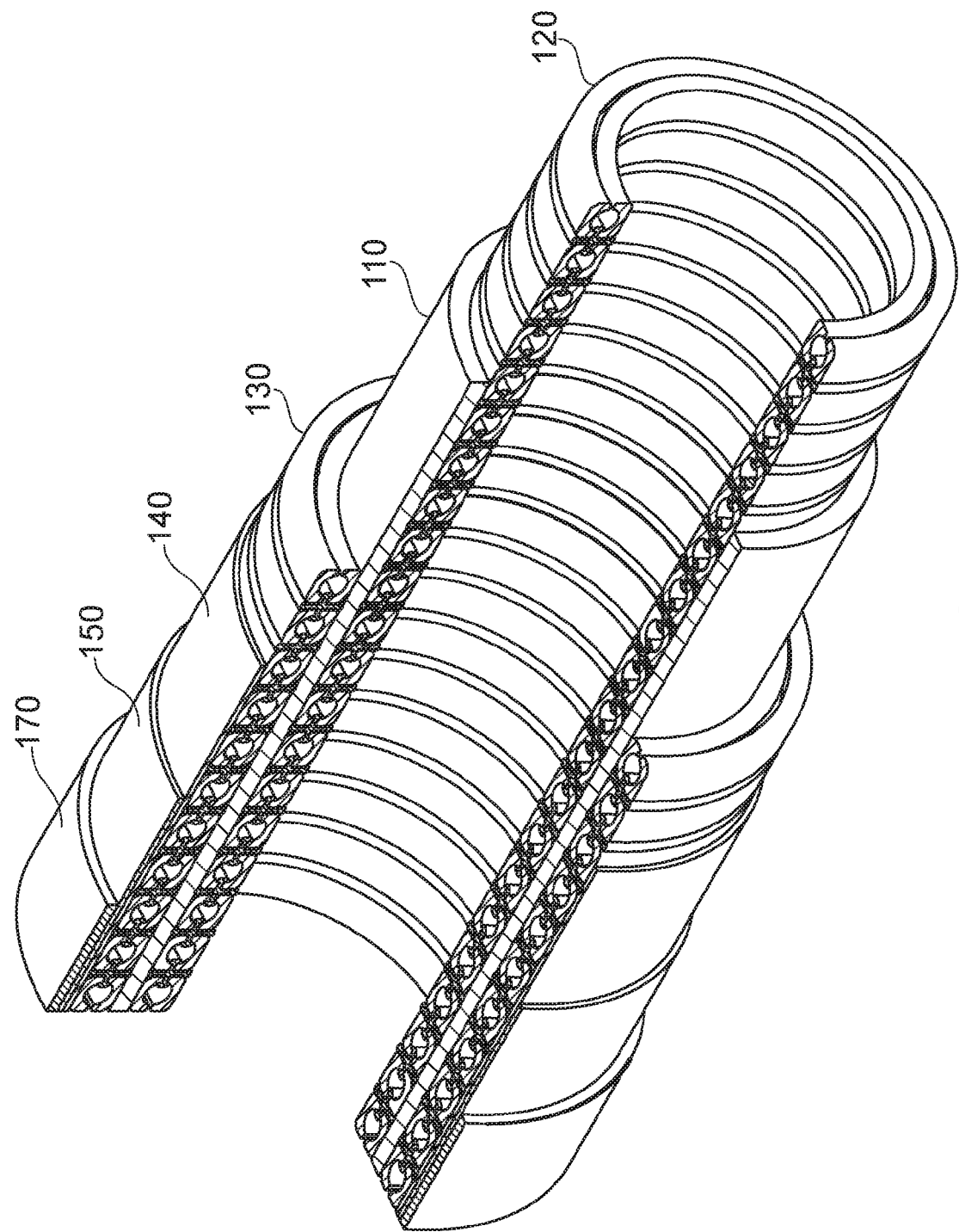
FIG. 1 illustrates flexible pipe body.

Turning to FIG. 1 it will be understood that the illustrated flexible pipe is an assembly of a portion of pipe body and one or more end fittings in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres. Certain other possible examples are described herein below.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that an optional carcass layer 120, where it is used, is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially within the barrier layer.

A pressure armour layer 130 is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition. A pressure armour layer is radially outside an underlying barrier layer or liner.

The flexible pipe body also includes an optional first tensile armour layer 140 and optional second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is typically formed from a plurality of wires. (To impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape (not shown) which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation (not shown) and an outer sheath 170, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
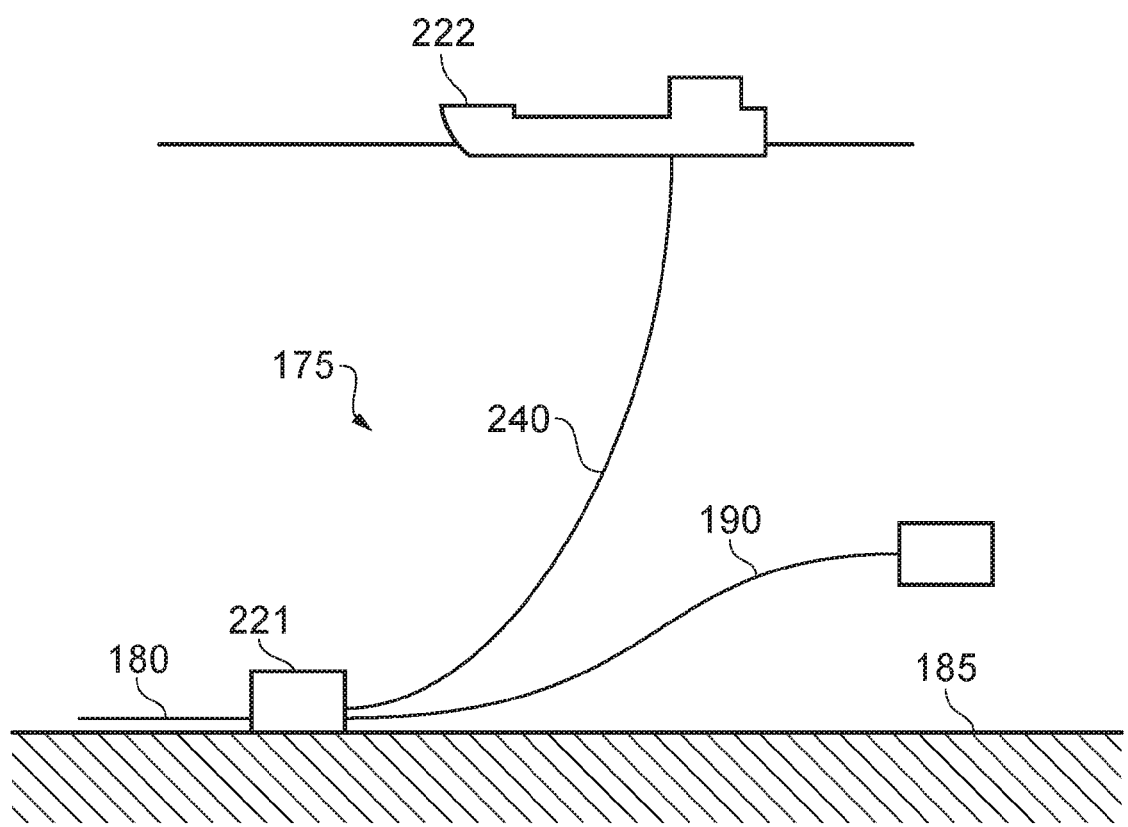
FIG. 2 illustrates uses of a flexible pipe.

FIG. 2 illustrates a riser assembly 175 suitable for transporting production fluid such as oil and/or gas and/or water from a sub-sea location 221 to a floating facility 222. For example, in FIG. 2 the sub-sea location 221 includes a sub-sea flow line 180. The flexible flow line 180 comprises a flexible pipe, wholly or in part, resting on the sea floor 185 or buried below the sea floor and used in a static application. The floating facility may be provided by a platform and/or buoy or, as illustrated in FIG. 2, a ship. The riser assembly 175 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 190.

Figure 3:
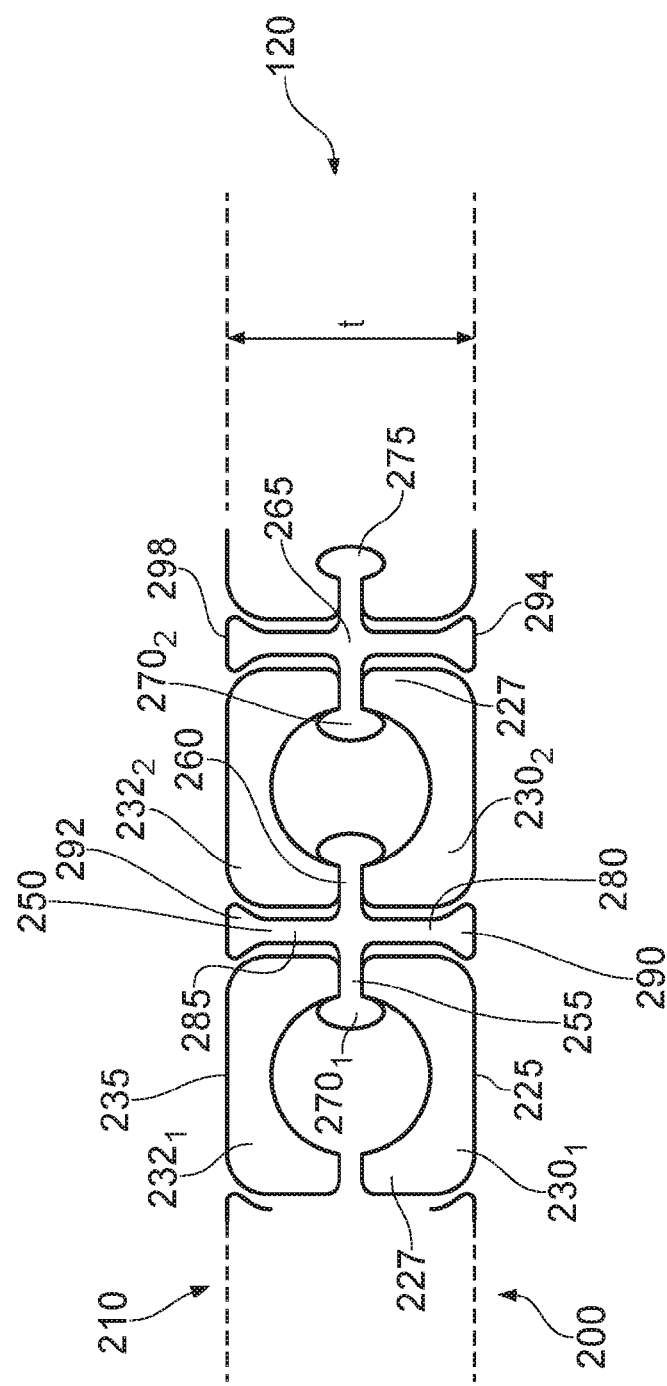
FIG. 3 illustrates the connection of adjacent windings in a carcass layer.

FIG. 3 illustrates a closer view of the carcass layer 120 illustrated in FIG. 1. FIG. 3 helps illustrate how a carcass layer can be formed by interlocking adjacent hoop-like elements. More particularly, as shown in FIG. 3 adjacent hoop-like elements are provided by helically winding C-shaped tapes (that is to say tapes having a common generally C-shaped cross section) and then interconnecting those adjacent windings of the wound tapes via a helically wound intermediate connector. It will be appreciated that whilst the embodiment illustrated in FIG. 3 provides adjacent hoop-like elements by helically winding two (or more) tapes, certain other embodiments of the present invention can utilise discrete hoops each formed as an endless ring having a particular common cross section and arranged side-by-side and concentrically next to each other and interlocked by cooperating aspects of the cross sections. Alternatively interlocking can be achieved via a separate locking element formed as a winding or hoop.

As illustrated in FIG. 3 the carcass layer 120 has a radially innermost surface 200 and a radially outer most surface 210. In use the radially innermost surface 200 faces towards the inner bore of the flexible pipe body. The radially outer most surface 210, in use, faces radially outwardly and is juxtaposed against a radially inner surface of the barrier layer 110. The carcass layer 120 is provided by winding a first or inner tape which has a generally C-shaped cross section in which the flat back 225 of the C forms part of the radially innermost surface of the carcass layer. Two curved ends 227 of the cross section of the first tape 230 face radially outwardly. A tip at the end of each curved end provides a substantially flat riding surface. The tape 230 is wound helically so that adjacent windings 2301, 2302 are located in a spaced apart relationship in an axial direction.

A further (radially outer) tape 232 is wound having a similar pitch to the inner tape 230 but in which the C-shaped cross section of the tape is in a mirrored position with respect to the inner tape of the first windings. As a result a flat back 235 of the cross section of the further C-shaped tape helps form the radially outer surface 210 of the carcass layer which, in use will be juxtaposed against, and thus face, the radially innermost surface of the barrier layer.

A generally cruciform-shaped connector tape 250 is utilised to link and thereby interconnect the C-shaped cross section tapes of the carcass layer 120. As illustrated in FIG. 3 the connector tape 250 is provided as a continuous helically windable tape body which includes a first connecting arm 255 and a further connecting arm 260. The two connecting arms extend away from one another and away from a common centre 265 of the connector body. The first connecting arm 255 ends in a bulbous nose 270 and the second connecting arm 260 ends in a similar bulbous nose 275. The bulbous noses each form a respective locking member and the connecting arms locate between opposed curved ends of the C-shaped tapes of the carcass layer. The connecting arms help restrain relative motion of adjacent windings in a radially outward or inward motion and an outer surface thus helps lock the adjacent elements in a desired relative position. The bulbous noses help act as locking members so as to limit lateral motion of adjacent windings thus preventing them from separating too far. Nevertheless some lateral motion of the C-shaped tapes is possible by a sliding motion between the radially outer surface of the connecting arms and the riding surfaces at the tips of curved sections of the C-shaped tapes. Other shapes of locking ends could of course be utilised. Each bulbous nose thus provides a turned out surface (that is to say turned out with respect to an axis of a connecting arm) that forms a stop.

In addition to the two connecting arms 255, 260 the connector body 250 shown in FIG. 3 has a radially inwards pointing support arm 280 and a radially outward pointing support arm 285. Each support arm extends away from one another away and from the common centre 265 of the connector body. As illustrated in FIG. 3 the lower support arm 280 which extends radially inwards towards the bore of the flexible pipe body terminates with a flared end 290. The opposed (outer) support arm 285 terminates with a respective flared end 292 which is located at the radially outer most surface 210 of the carcass. The flared end 290 at the end of the first support arm 280 provides an abutment surface 294 whilst the further flared end 292 of the radially outer support arm likewise provides an abutment surface 298. The flared ends may have a common shape or may alternatively be shaped according to purpose i.e. to minimise risk of singing or creep.

The innermost flared end 290 and its respective abutment surface 294 can help cover and/or fill the radially innermost gap which would otherwise be created between adjacent windings of the inner tape 230 as it is wound to form the carcass layer 120. It will be appreciated that whilst the inner abutment surface 294 is referred to as an "abutment" surface for the radially innermost surface 200 of a carcass layer there may not in practice be anything other than fluid abutting/flowing against the surface in use. The flared portion has a cross section selected to match with the opposed surfaces of the C-shaped inner tape so as to help maximise filling of the space between adjacent windings. Alternatively the flared portion may instead comprise just a cover that at least partially covers the gaps from the point of view of fluid flowing along the pipe and which extends out from the support arm. Likewise the abutment surface on the inner surface of the carcass layer can have a surface or finish selected to help control fluid flow along the inner bore of the flexible pipe and thus help prevent vortex shedding sites. In this way use of a connecting body of a connector tape 250 can include at least one support arm that extends away from the common centre portion of the connector body substantially perpendicular to opposed arm portions and terminates with a flared end portion. Thus by forming the carcass layer of the various tapes illustrated in FIG. 3 not only is a crush resistant layer created but also it is created in a way which helps wholly cover or at least partially cover gaps on the radially inner surface of the carcass layer. This helps eliminate or at least partly reduce a risk of singing when a flexible pipe using flexible pipe body which incorporates such a carcass layer is put into use.

It will be appreciated that whilst FIG. 3 illustrates a flared portion and respective abutment surface which substantially aligns with a smooth inner surface 200, one or more portions of the flared part and abutment surface can extend outwardly (or indeed inwardly) by a small distance into the bore of the flexible pipe. This can likewise have an effect of reducing a carcass singing problem.

By contrast the radially outward pointing support arm 285 of the connector tape, which likewise terminates in a flared out portion 292 and respective abutment surface 298, can be utilised to partially fill and/or cover a gap at the radially outer side of the carcass layer. As such the flared out portion and abutment surface face a barrier layer which would, in use, be juxtaposed closely against this outer surface 210 of the carcass layer. By filling and/or at least partially covering the gap at the radially outer surface of the carcass layer between adjacent windings ingress of polymer material from the barrier layer can be prevented. Thus the problems associated with polymer creep of a barrier layer can be wholly or at least partially mitigated.

The pressure resistant layer shown in FIG. 3 has a predetermined thickness t. The distance between the common centre region 265 to the abutment surfaces is about 0.5 t. It will be appreciated that the common centre may not be exactly in the middle of the layer thickness in accordance with certain other embodiments of the present invention. Aptly the distance from one of the abutment surfaces is 0.7 t or less. Aptly the distance is 0.6 t or less.

Figure 4:
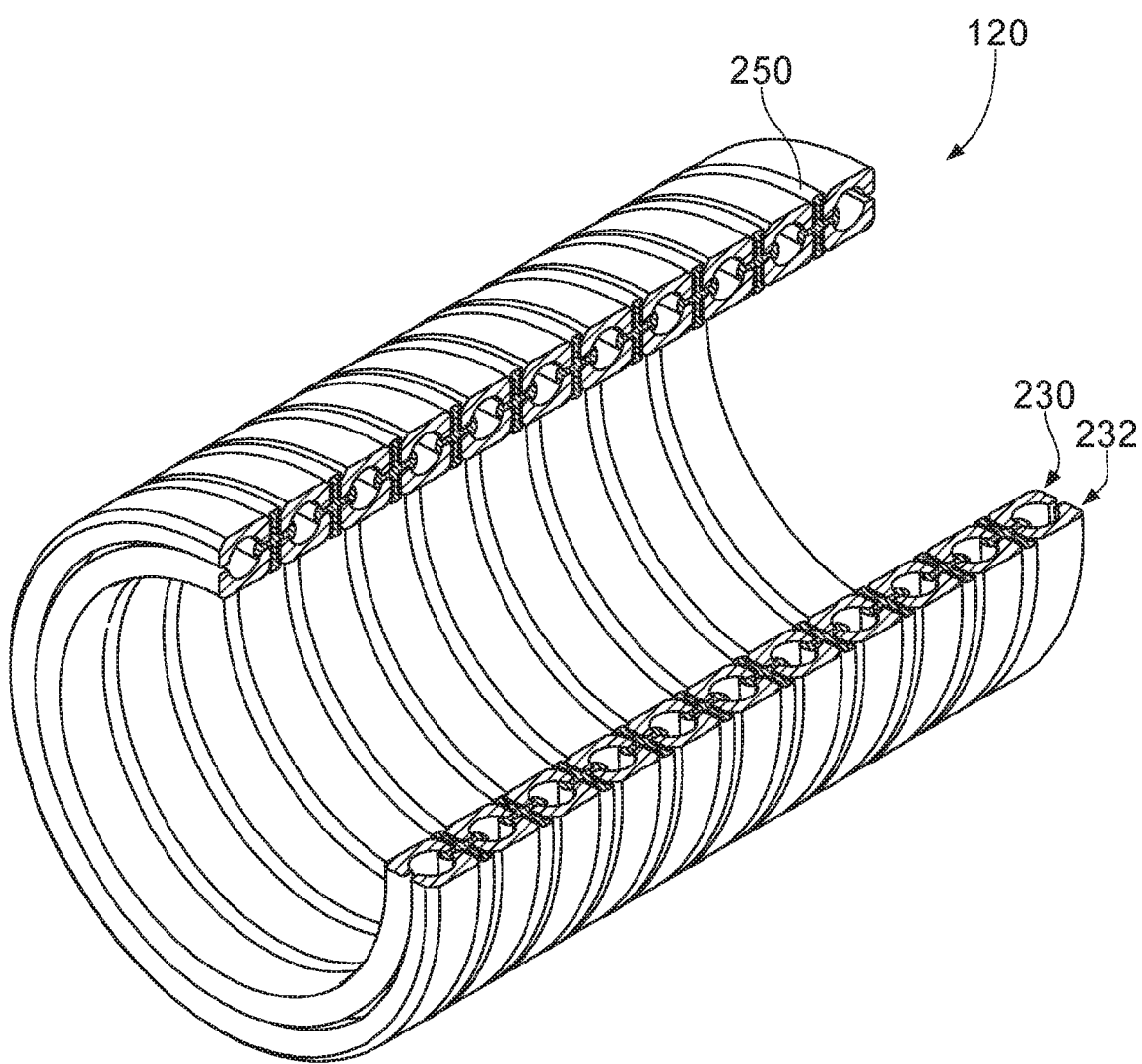
FIG. 4 illustrates the connection of adjacent windings of a carcass layer.

FIG. 4 helps illustrate a carcass layer 120 generated by helically winding the tapes shown in FIG. 3 in more detail. It will be appreciated that in addition or alternatively a pressure armour layer could be provided in a like manner (as shown in FIG. 1).

Figure 5:
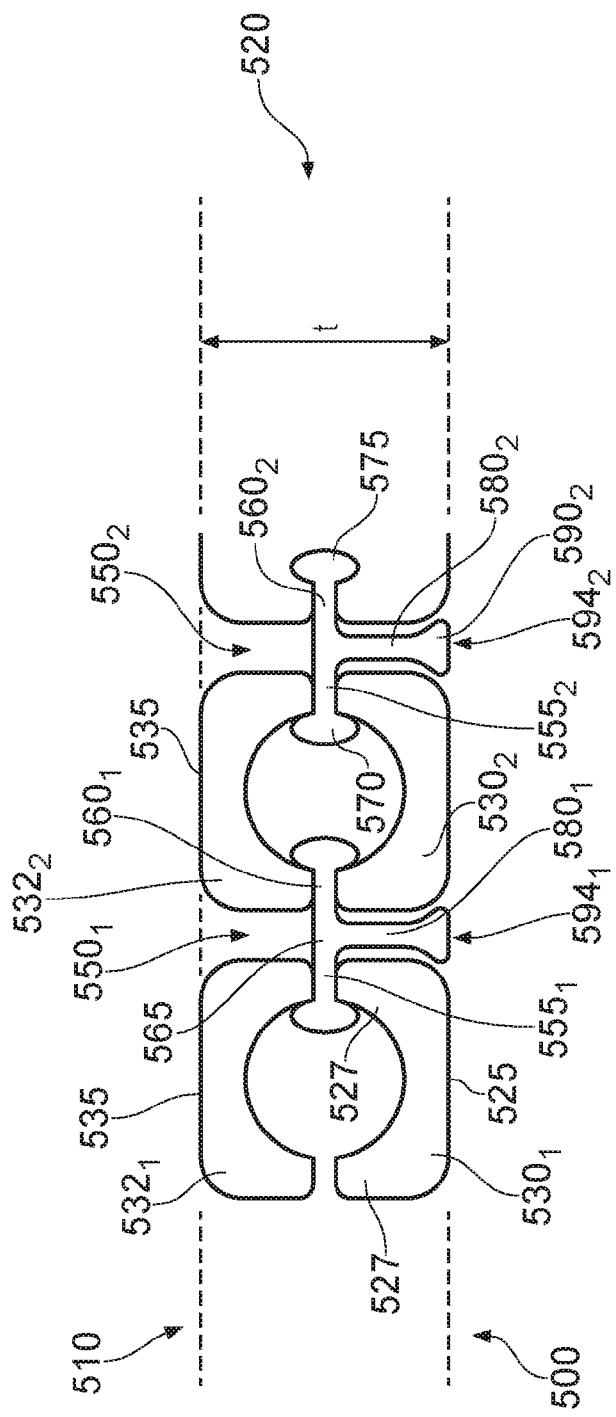
FIG. 5 illustrates the connection of adjacent windings of tape forming a carcass layer.

It will be appreciated that whilst FIG. 3 and FIG. 4 illustrates a carcass layer formed by a connector tape that has a cruciform cross section certain other embodiments of the present invention can utilise a connector tape that has a generally T-shaped cross section. Such a carcass layer is illustrated in FIG. 5. The carcass layer illustrated in FIG. 4 is provided to help tackle the "singing" problem. It will be appreciated that as an alternative the T-shaped connector may be reversed in orientation so that risk of creep of the barrier layer can be reduced by locating a flared out end of a support arm of the connector tape in a position to cover (partially or wholly) a gap between windings of the hoop-like elements.

FIG. 5 helps illustrate an alternative carcass layer 520. FIG. 5 helps illustrate how a carcass layer can be formed by interlocking adjacent hoop-like elements. More particularly, as shown in FIG. 5 adjacent hoop-like elements are provided by helically winding C-shaped tapes (that is to say tapes having a common generally C-shaped cross section) and then interconnecting those adjacent windings of the wound tapes via a helically wound intermediate connector. It will be appreciated that whilst the embodiment illustrated in FIG. 5 provides adjacent hoop-like elements by helically winding one or more elongate tapes, certain other embodiments of the present invention can utilise discrete hoops each formed as an endless ring having a particular cross section and arranged side-by-side and concentrically next to each other and interlocked by cooperating aspects of the cross sections of interposed discrete connectors.

As illustrated in FIG. 5 the carcass layer 520 has a radially innermost surface 500 and a radially outer most surface 510. In use the radially innermost surface 500 faces towards the inner bore of the flexible pipe body. The radially outer most surface 510, in use, faces radially outwardly and is juxtaposed against a radially inner surface of a barrier layer 110. The carcass layer 520 is provided by winding a first or inner tape which has a generally C-shaped cross section in which the flat back 525 of the C forms part of the radially innermost surface of the carcass layer. Two curved ends 527 of the cross section of the first tape 530 face radially outwardly and each tip of each end provides a sliding surface. The tape 530 is wound helically so that adjacent windings $530_1$, $530_2$ are located in a spaced apart relationship.

A further (radially outer) tape 532 is wound having a similar pitch to the radially inner tape 530 but in which the C-shaped cross section of the tape is in a mirrored position with respect to the inner tape of the first windings. As a result a flat back 535 of the cross section of the further C-shaped tape helps form the radially outer surface 510 of the carcass layer which, in use, will be juxtaposed against and thus face, the radially innermost surface of the barrier layer. A generally T-shaped connector tape 550 is utilised to link and interconnect the C-shaped cross section tapes of the carcass layer 520. As illustrated in FIG. 5 the connector tape 550 is provided as a continuous body which includes a first connecting arm 555 and a further connecting arm 560. Each connecting arm portion of the connector tape is a restraining arm portion in the sense that it restrains relative radially inward or outward motion of adjacent tape windings. In this sense an outer surface of each laterally extending arm helps lock windings in a desired relative position. The two connecting arms extend away from one another and away from a common centre point 565 of the connector body. The first connecting arm 555 ends in a bulbous nose 570 and the second connecting arm 560 ends in a similar bulbous nose 575. The bulbous noses each help form a respective locking member and the connecting arms locate between opposed curved ends of the C-shaped tapes of the carcass layer. The bulbous noses and the outer surfaces they impose help act as locking members so as to limit lateral motion of adjacent windings thus preventing them from becoming too separated. Nevertheless some lateral motion of the C-shaped tapes is possible by a sliding motion between the radially outer surface of the connecting arms and the abutment ends of curved sections of the C-shaped tapes. Other shapes of locking ends could of course be utilised.

In addition to the two connecting arms 555, 560 the connector body shown in FIG. 5 has a radially inwards pointing support arm 580. The support arm extends away from the common centre point 565 of the connector body. As illustrated in FIG. 5 the lower support arm 580 which extends radially inwards towards the bore of the flexible pipe body terminates with a flared end 590. The flared end 590 at the end of the first support arm 580 provides an abutment surface 594.

The innermost flared end 590 and its respective abutment surface 594 can help cover and/or fill the radially innermost gap which otherwise be created between adjacent windings of the inner tape 530 as it is wound to form the carcass layer 520. It will be appreciated that whilst the inner abutment surface 594 is referred to as an "abutment" surface for the radially innermost surface 500 of a carcass layer there may not in practice be anything other than fluid abutting/flowing against the surface in use. The flared portion has a cross section selected to match with the opposed surfaces of the C-shaped inner tape so as to help maximise filing of the space between adjacent windings yet retain flexibility. Alternatively the flared portion may instead comprise just a cover that at least partially covers the gaps from the point of view from the fluid flowing along the pipe. Likewise the abutment surface on the inner surface of the carcass layer can have a surface or finish selected to help control fluid flow along the inner bore of the flexible pipe and thus help prevent vortex shedding sites. In this way use of a connecting body of a connector tape 550 can include at least one support arm that extends away from the common centre portion of the connector body substantially perpendicular to opposed arm portions and terminates with a flared end portion. Thus by forming the carcass layer from the various tapes illustrated in FIG. 5 not only is a crush resistant layer created but also it is created in a way which helps wholly cover or at least partially cover gaps on the radially inner surface of the carcass layer. This helps eliminate or at least partly reduces a risk of singing when a flexible pipe using flexible pipe body which incorporates such a carcass layer is put into use.

It will be appreciated that whilst FIG. 5 illustrates a flared portion and respective abutment surface which substantially aligns with a smooth inner surface 500, one or more portions of the flared part and abutment surface can extend outwardly (or indeed inwardly) by a small distance for example into the bore of the flexible pipe. This can likewise have an effect of reducing a carcass singing problem. Aptly the surface includes asperities. Aptly the surface is crenelated. Aptly the surface includes one or more boss or column or slit or slot or the like.

It will be appreciated that FIG. 5 thus helps illustrate how a carcass layer can be formed which solves only one of the problems of avoiding creep or singing. In the embodiment illustrated in FIG. 5 the carcass layer is provided to help overcome the singing problem as the interconnecting element covers the gaps at the radially innermost side of the carcass layer. As an alternative, it will be appreciated that certain other embodiments of the present invention can utilise a carcass layer in which the connecting body is wound "upside down" relative to that shown in FIG. 5. As such the supporting arm, flared portion and abutment surface would be provided at the radially outer surface of the carcass layer. This would help avoid any risk of creep of the polymer from an overlying barrier layer from creeping into gaps between adjacent windings.

The pressure resistant layer shown in FIG. 5 has a predetermined thickness t. The distance between the common centre region 565 to the abutment surface 594 is about 0.5 t. It will be appreciated that the common centre may not be exactly in the middle of the layer thickness in accordance with certain embodiments of the present invention. Aptly the distance from the centre to the abutment surface is 0.7 t or less. Aptly the distance is 0.6 t or less.

Figure 6:
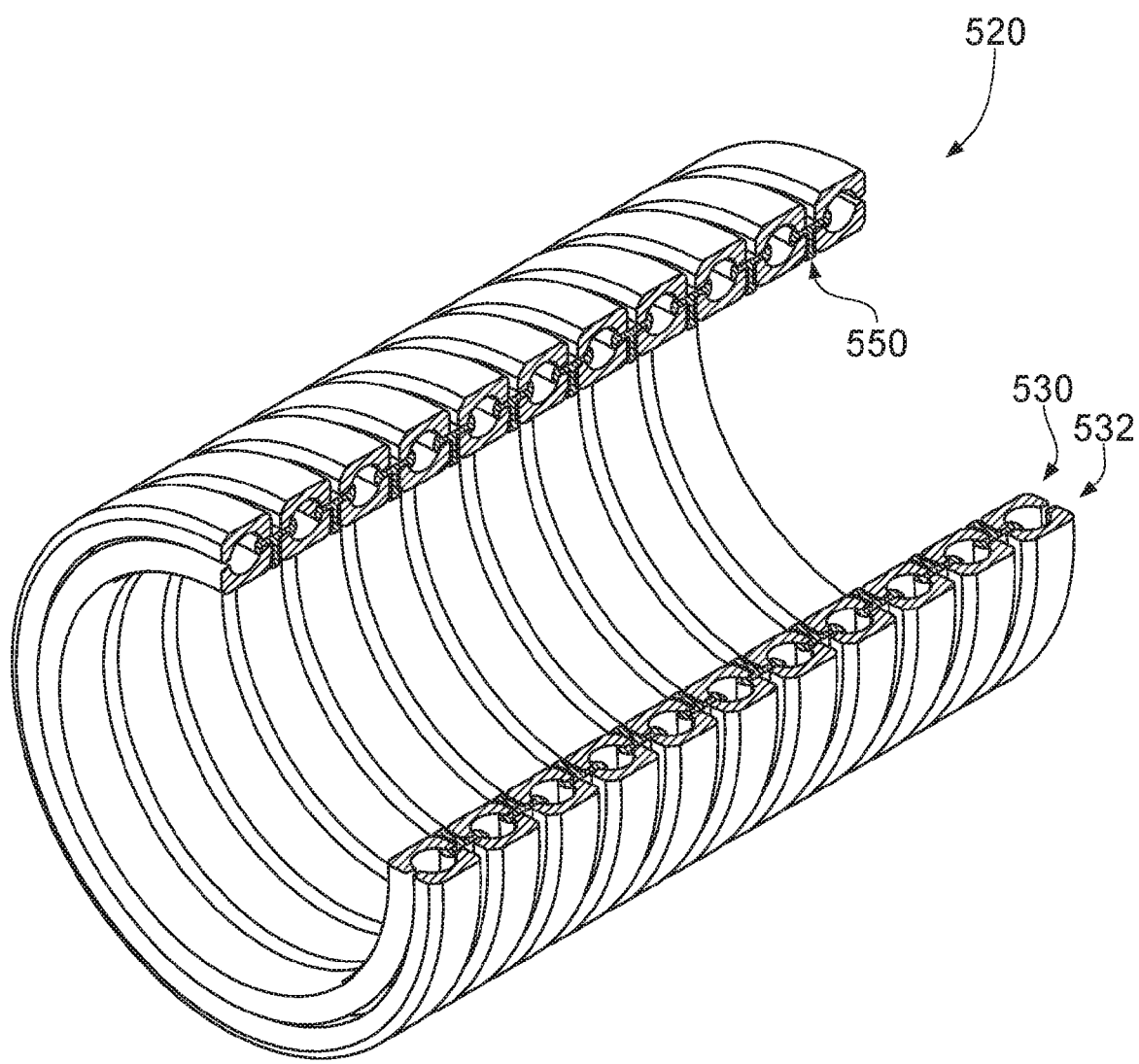
FIG. 6 illustrates carcass layer provided by the connection of adjacent windings shown in FIG. 5.

FIG. 6 helps illustrate a carcass layer 520 generated by helically winding the tapes shown in FIG. 5 in more detail. It will be appreciated that whilst FIGS. 5 and 6 illustrate a carcass layer another type of pressure resistant layer such as a pressure armour layer could alternatively or additionally be constructed and thereby provided in a similar way.

FIGS. 3, 4, 5 and 6 thus help illustrate how a pressure resistant layer such as a carcass layer can be provided and which includes a connecting tape which can serve the dual purpose of interlocking adjacent windings as well as including one or more parts which serve an additional function. These additional support arm portions of the connecting tape can be utilised so that the layer provided helps prevent singing alone or helps prevent creep alone or helps prevent risk of both singing and creep.

Figure 7:
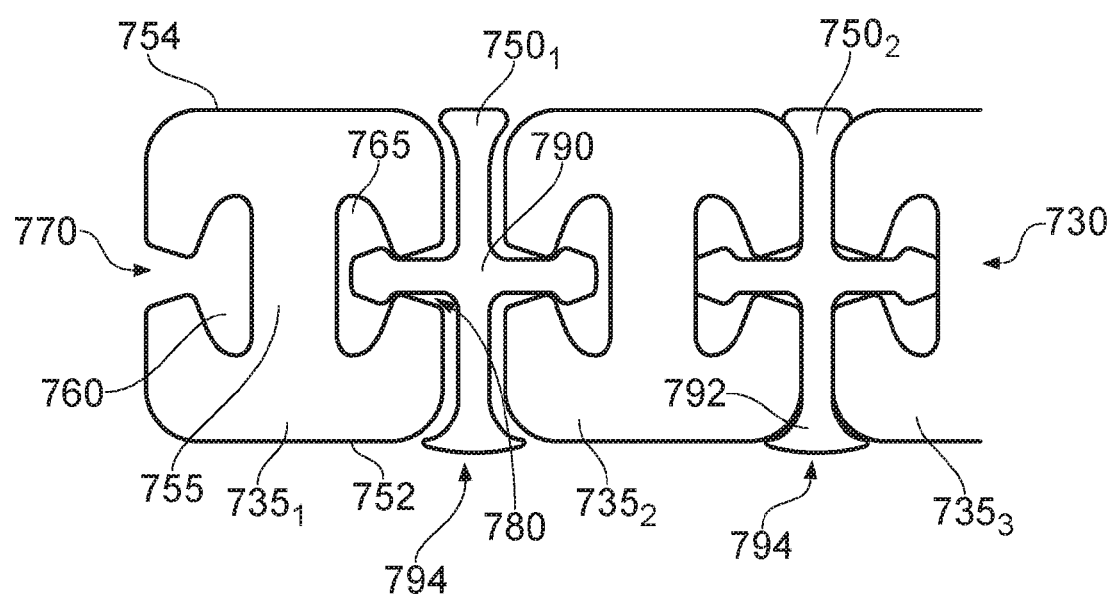
FIG. 7 illustrates a pressure armour layer formed by interlocking windings.

FIG. 7 helps illustrate a closer view of an alternative pressure armour layer 730. It will be appreciated that as an alternative the cross sections and elements in FIG. 7 could likewise be utilised to form another type of pressure resistant layer such as a carcass layer of a flexible pipe.

As illustrated in FIG. 7 adjacent hoop-like elements are provided by helically winding I-shaped tapes 735 (that is to say a tape having a common generally I-shaped cross section) and then interconnecting adjacent windings of the wound tape via a helically wound intermediate connector 750. It will be appreciated that whilst the embodiment illustrated in FIG. 7 provides adjacent hoop-like elements by helically winding tapes, certain other embodiments of the present invention can utilise discrete hoops each formed as an endless ring having particular common cross section and arranged side-by-side and concentrically next to each other and interlocked by cooperating aspects of the cross sections.

As illustrated in FIG. 7 the pressure armour layer 730 has a radially innermost surface and a radially outer most surface. A distance t between the radially innermost and outermost surface sets a predetermined layer thickness t. A distance between a common intersecting region at a position where the axis of the connecting arms and support arms shown meet is around 0.5t. In use the radially innermost surface faces towards a barrier layer or liner of the flexible pipe body. In use the radially outer layer faces outwards towards optional tensile armour layers, tape layers and ultimately an outer sheath of the flexible pipe body.

As illustrated in FIG. 7 the I-shaped tape 735 has a radially inner flat surface 752 and a radially outer flat surface 754. Inset regions 760 are provided on the left hand side (in FIG. 7) of the body and further inset regions 765 are provided on the right hand side (in FIG. 7) of the body. An opening 770 on a left hand side (in FIG. 7) of the I-shaped tape leads into the recess 760. The opening 770 provides an open mouth which is tapered so as to narrow towards the centre of the tape. A similar opening 780 in the right hand side (in FIG. 7) of the I-shaped connector opens into the recess 765 and is likewise tapered inwardly towards the centre of the body. The recesses are formed by curved together ears in the I-shaped profile which bend in together on each side of the profile.

As illustrated in FIG. 7 a generally cruciform shaped connecting tape 750 is utilised to interlock adjacent windings of the I-shaped tape. The helically wound intermediate connector 750 has opposed connecting arms which each terminate in an engorged locking member and a first and further oppositely orientated support arm. The support arms and connecting arms extend away from a common intersecting region 790 at a position where the axis of the arms shown meet. The radially inwardly pointing support arm of the intermediate connector is flared out into a flared out portion 792 which has an arcuate curved end surface which forms an abutment surface 794. A central stalk 755 connects a radially inner and radially outer part of the body of the I-shaped tape.

Figure 8:
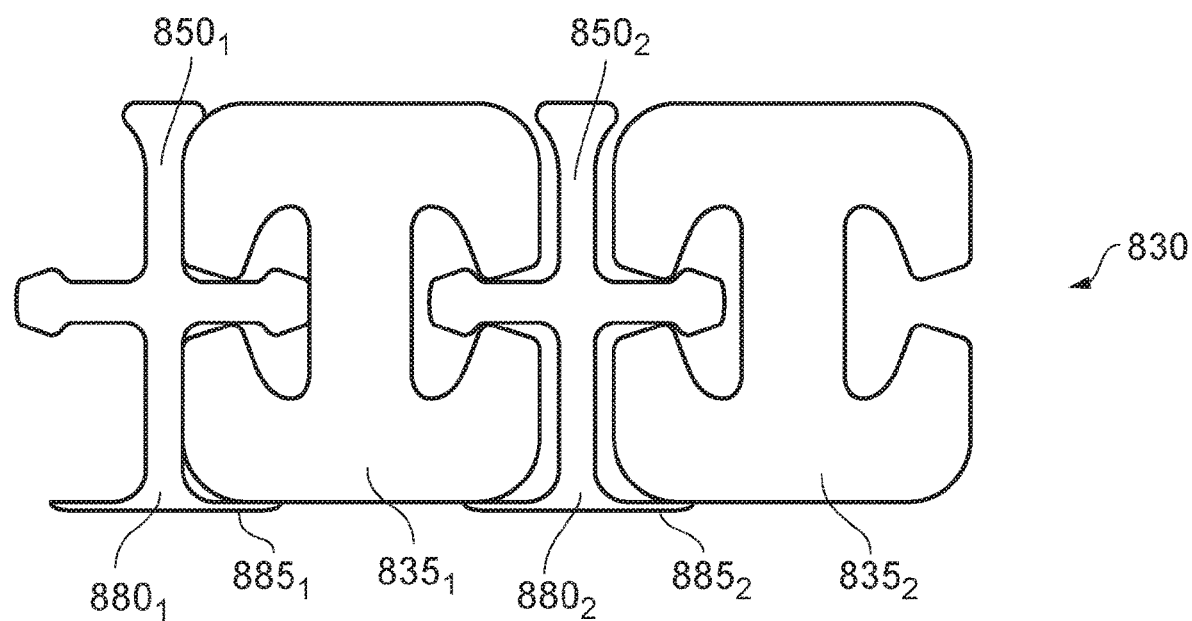
FIG. 8 illustrates an alternative pressure armour layer.

FIG. 8 helps illustrate an alternative pressure armour layer 830 in which generally I-shaped wound tape provides hoop-like elements for the layer. It will be appreciated that whilst the embodiment illustrated in FIG. 8 provides adjacent hoop-like elements by helically winding tapes, certain other embodiments of the present invention can utilise discrete hoops each formed as an endless ring having a particular common cross section and arranged side-by-side and concentrically next to each other with radial and/or lateral relative motion locked to some extent by cooperating aspects of the cross section.

As illustrated in FIG. 8 the radially inner flared out portion of the intermediate connector ends in a wide cap 880 which has a wide flat abutment surface 885. Having such a wide flared out portion helps cover the gaps between windings so as to help shield those gaps from any underlying polymer layer which might otherwise be inclined to flow radially outwardly over time. Such wide caps can be utilised with any of the embodiments described. It will be appreciated that as an alternative the profile tapes illustrated in FIG. 8 could be utilised to provide a carcass layer in which case the flared out portions 880 and abutment surface 885 could help prevent singing of the carcass layer. Likewise similar flared out portions could additionally or alternatively be provided on a radially outward facing support arm which would then help prevent ingress of polymer from an overlying barrier layer into such a carcass layer.

Figure 9:
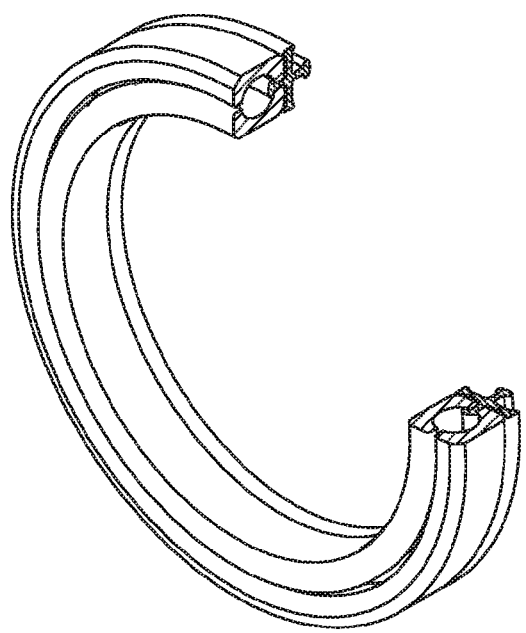
FIG. 9 illustrates a discrete hoop and connector formed as a discrete hoop.
Figure 10:
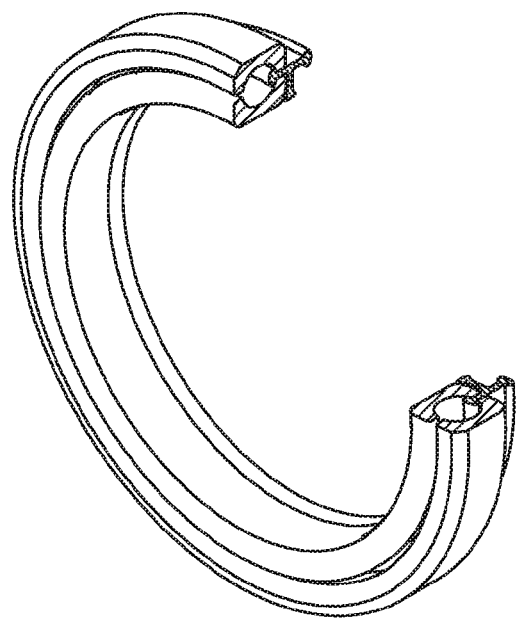
FIG. 10 illustrates an alternative discrete hoop and connector formed as a discrete hoop.

FIGS. 9 and 10 illustrate alternative embodiments in which the various profiled elements are formed as endless rings. In each case of FIGS. 9 and 10 the endless ring is shown broken, for the sake of understanding so as to help illustrate the cross section of the various elements. Multiple discrete hoops can be laid side-by-side in a concentric arrangement and pushed together to interlock consecutive elements so as to ultimately provide a flexible tube like structure which can form a carcass layer and/or pressure armour layer of a flexible pipe.

Figure 11:
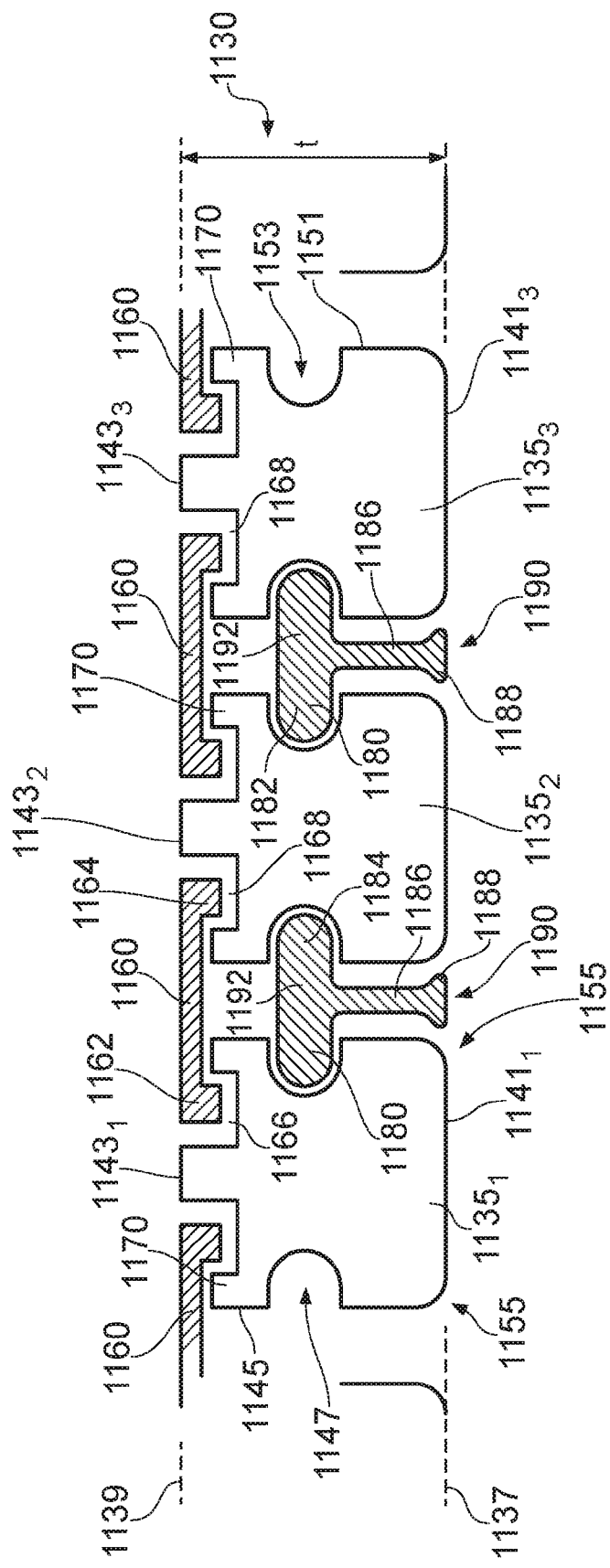
FIG. 11 illustrates an alternative pressure armour layer and helps illustrates use of a connector body with restraining arms, formed as protuberances and using separate interlocking elements to interlock adjacent hoop-like elements formed as discrete hoops.

FIG. 11 helps illustrate an alternative pressure armour layer 1130 in which profiled tape windings $1135_{1...3}$ provide hoop-like elements for the layer. The layer 1130 has a radially inner surface 1137 and a radially outer surface 1139. It will be appreciated that whilst the embodiment illustrated in FIG. 11 provides adjacent hoop-like elements by helically winding tapes, certain other embodiments of the present invention can utilise discrete hoops each formed as an endless ring having a particular common cross section and arranged side-by-side and concentrically next to each other with radial and/or lateral relative motion locked to some extent by cooperating aspects of the cross sections.

As illustrated in FIG. 11 the cross sectional profile of the wound tape 1135 has a substantially flat radially innermost surface 1141 spaced apart from and substantially parallel with a radially outer centrally located planar surface 1143. The radially outer surface 1143 lies in the plane of the radially outer surface of the layer 1130. A left hand side (shown in FIG. 11) side wall 1145 has a central recess 1147. A right hand side (shown in FIG. 11) side wall 1151 has a central recess 1153. Each side wall 1145, 1151 meets the radially innermost planar surface 1141 via a respective curved corner region 1155.

A separate interlocking winding tape 1160 is wound between adjacent pressure armour layer tape windings 1135 to interlock the adjacent windings. That is to say to help control the amount of lateral movement permitted between adjacent windings. The interlocking tape 1160 has radially inner projecting ends 1162, 1164 which cooperate with respective recesses 1166, 1168 in the radially outermost surface of the pressure armour layer windings. Upturned noses 1170 terminate respective ends of each recess 1166, 1168 of the pressure armour tape windings and form respective abutment surfaces for the noses 1162, 1164 of the locking tape.

FIG. 11 also helps illustrate how an intermediate connector 1180 can be wound and thus interposed between adjacent pressure armour layer windings 1135. The intermediate connector can be interposed between adjacent hoop-like elements to help form a pressure resistant layer. The connector body 1180 is an elongate element which can be helically wound (although as noted previously if discrete hoops are utilised the connector body can be provided by multiple discrete hoops having the cross section shown).

The connector body 1180 shown in FIG. 11 includes a left hand side (shown in FIG. 11) protuberance 1182 and a right hand side (shown in FIG. 11) protuberance 1184. The first protuberance provides a restraining arm portion and extends into the recess 1153 on the right hand side (in FIG. 11) recess of an adjacent pressure armour layer winding. The right hand side protuberance 1184 of the connector body 1180 provides a restraining arm portion of the connector body and extends into the left hand side (shown in FIG. 11) recess 1147 of an adjacent winding of the pressure armour tape. Thus, whilst the connector body does not control a moving apart motion of adjacent pressure armour layer tape windings, the outer surface of the connector body arms act to restrain radially inward and outward motion as well as providing an abutment surface that help control clashing together lateral motion of adjacent windings. In this sense the outer surface of the protuberances help provide respective locking surfaces to help determine a respective relative position of adjacent windings.

As illustrated in FIG. 11 the connector body also includes a radially inwards extending support arm 1186 which includes a flared end portion 1188 which terminates in an abutment surface 1190. The abutment surface is thus located between adjacent windings of the pressure armour layer tape to help provide resistance to creep of the radially outer surface of an underlying barrier layer or liner.

As illustrated in FIG. 11 the protuberances from the connector body extend outwardly from a common intersecting region and the support arm 1186 likewise extends outwardly in a substantially perpendicular direction from that common intersecting region. The pressure resistant layer 1130 has a predetermined thickness t. The distance between the common centre region 1192 and the abutment surface 1190 is about 0.5 t. It will be appreciated that the common centre may not be exactly around the middle of the layer thickness in accordance with certain other embodiments of the present invention. Aptly the distance from an abutment surface 1190 to the common centre region 1192 is 0.7 t or less. Aptly the distance is 0.6 t or less.

Whilst the embodiments previously described have been referred to as providing abutment surfaces at the end of support arms of an intermediate connector that are smooth (albeit flat or arcuate) it will be appreciated that for any of the embodiments described the abutment surfaces may include a partial or whole surface region which is not smooth. That is to say each flared end portion abutment surface of a support arm can include at least one projecting member or at least one recessed member. For example the abutment surfaces can include multiple grooves or multiple blind holes or multiple dimples or multiple slits or multiple slots or multiple bosses or multiple posts or the like. Such devices can help improve catch up or anti singing properties (as appropriate).

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Flexible pipe body for transporting fluids, comprising:
a pressure resistant layer, having a predetermined thickness, and comprising a plurality of adjacent hoop-like elements; and
apparatus for interposing between adjacent hoop-like elements, the apparatus comprising:
at least one connector body configured for interlocking adjacent hoop-like elements and comprising:
a first restraining arm portion and an opposed further restraining arm portion, each extending outwardly away from a common intersecting region of the connector body and comprising a respective locking surface, wherein each restraining arm portion is a connecting arm portion of the connector body, and wherein each connecting arm portion terminates in a respective bulbous locking member at an end region of the respective connecting arm portion, wherein the bulbous locking member comprises the respective locking surface; and
at least one support arm portion that extends from the common intersecting region substantially perpendicular to the restraining arm portions and terminates with a flared end portion providing an abutment surface, wherein a distance between the common intersecting region and the abutment surface is less than 60% of said predetermined thickness;
wherein said connector body is interposed between the hoop-like elements; and
the restraining arm portions at least partially restrain relative motion of adjacent hoop-like elements in a radially outward or radially inward motion, and the bulbous locking members limit lateral motion of adjacent hoop-like elements; and the at least one support arm portion is arranged to provide said at least one flared out portion at a radially inner and/or radially outer interface region between adjacent hoop-like elements.

2. Flexible pipe body as claimed in claim 1, further comprising:
each locking member comprises at least one turned out abutment surface at an end region of a respective restraining arm portion that extends away from an axis of the restraining arm portion for preventing an element riding on an outer surface of the restraining arm portion extending beyond an end of the restraining arm portion.

3. Flexible pipe body as claimed in claim 2, further comprising:
the at least one turned out abutment surface comprises a region of an outer surface of a respective arm portion that widens out at an end of the arm portion.

4. Flexible pipe body as claimed in claim 1, further comprising:
each restraining arm portion comprises a protuberance extending from the common intersecting region and each respective locking surface comprises an outer surface region of a respective protuberance.

5. Flexible pipe body as claimed in claim 1, wherein each flared end portion abutment surface of a support arm portion is substantially flat or arcuate.

6. Flexible pipe body as claimed in claim 1, further comprising:
each flared end portion abutment surface of a support arm portion comprises at least one projecting member or at least one recessed member.

7. Flexible pipe body as claimed in claim 6, further comprising:
each flared end portion abutment surface comprises at least one groove or blind hole or dimple or slit or slot or boss or post.

8. Flexible pipe body as claimed in claim 1, wherein the connector body has a generally T-shape or cross-shaped cross section.

9. Flexible pipe body as claimed in claim 1, further comprising:
the connector body has a generally cross-shaped cross section and the at least one support arm portion comprises a first support arm portion and an opposed further support arm portion each extending away from the common intersecting region of the connector body in opposed directions and each comprising a respective flared end portion.

10. Flexible pipe body as claimed in claim 9, further comprising:

the flared end portions of the first and further support arm portions have a common shape or have dissimilar shape.

11. Flexible pipe body as claimed in claim 1, further comprising:
the connector body has a generally T-shaped cross section and the at least one support arm portion comprises only one support arm portion.

12. Flexible pipe body as claimed in claim 1, further comprising:
the adjacent hoop-like elements comprise adjacent windings of at least one helically wound elongate tape element and the connector body comprises an elongate helically windable tape body; or
the adjacent hoop-like elements comprise a plurality of discrete non-self-interlocking hoop members arranged concentrically in a side-by-side relationship and said at least one connector body comprises a plurality of discrete hoop members each formed as an endless ring.

13. A method for providing resistance to creep of polymer of a polymer layer in a flexible pipe, comprising the steps of:
providing a pressure resistant layer, for a flexible pipe comprising flexible pipe body as claimed in claim 1, by interlocking adjacent hoop-like elements via at least one connector body comprising opposed connecting arm portions, wherein each connecting arm portion terminates in a respective bulbous locking member at an end region of the respective connecting arm portion, wherein the bulbous locking member comprises a respective locking surface; and
simultaneously providing a flared out portion of a support arm portion of the connector body between adjacent interlocked hoop-like elements thereby providing an abutment surface of the flared out portion at a location to face a polymer layer of the flexible pipe juxtaposed with the pressure resistant layer for preventing creep of the polymer material of the polymer layer between the adjacent interlocked hoop-like elements.

14. The method as claimed in claim 13, further comprising:
providing the pressure resistant layer by helically winding an elongate tape element; and
providing the connector body by helically winding an elongate helically windable body between adjacent windings of the elongate tape element.

15. The method as claimed in claim 13, further comprising:
providing the pressure resistant layer by providing a plurality of non-self interlocking hoop members concentrically in a side-by-side relationship; and
providing a connector body interlocking hoop members between each pair of adjacent hoop members in a concentric side-by-side relationship with the hoop members.

16. A method for smoothing an inner surface provided by a carcass layer of a flexible pipe, comprising the steps of:
providing a pressure resistant layer as a carcass layer, for a flexible pipe comprising flexible pipe body as claimed in claim 1, by interlocking adjacent hoop-like elements via at least one connector body comprising opposed connecting arm portions, wherein each connecting arm portion terminates in a respective bulbous locking member at an end region of the respective connecting arm portion, wherein the bulbous locking member comprises a respective locking surface; and
simultaneously providing a flared out portion of a support arm portion of the connector body between the adjacent interlocked hoop-like elements thereby providing an abutment surface of the flared out portion at a location to at least partially cover a gap between the hoop-like elements at a radially inner side of the carcass layer.

17. The method as claimed in claim 16, further comprising:
providing the pressure resistant layer by helically winding an elongate tape element; and
providing the connector body by helically winding an elongate helically windable body between adjacent windings of the elongate tape element.

18. The method as claimed in claim 16, further comprising:
providing the pressure resistant layer by providing a plurality of non-self interlocking hoop members concentrically in a side-by-side relationship; and
providing a connector body interlocking hoop members between each pair of adjacent hoop members in a concentric side-by-side relationship with the hoop members.

* * * * *